US012580669B1

(12) United States Patent
Goto

(10) Patent No.: US 12,580,669 B1
(45) Date of Patent: Mar. 17, 2026

(54) LONG DURATION BROADBAND RF SPECTRUM SIGNAL VISUALIZATION

(71) Applicant: Keysight Technologies, Inc., Santa Rosa, CA (US)

(72) Inventor: Masaharu Goto, Hanno (JP)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 183 days.

(21) Appl. No.: 18/244,410

(22) Filed: Sep. 11, 2023

(51) Int. Cl.
*H04B 17/391* (2015.01)
*G06F 16/28* (2019.01)
*G06T 11/20* (2006.01)

(52) U.S. Cl.
CPC ......... *H04B 17/391* (2015.01); *G06F 16/287* (2019.01); *G06T 11/206* (2013.01)

(58) Field of Classification Search
CPC .... H04B 17/391; G06F 16/287; G06T 11/206
See application file for complete search history.

(56) References Cited

U.S. PATENT DOCUMENTS

| | | |
|---|---|---|
| 10,198,835 B2 | 2/2019 | Bernard et al. |
| 11,100,365 B2 | 8/2021 | Kobayashi et al. |
| 11,216,465 B2 | 1/2022 | Oberoi et al. |
| 11,429,616 B2 | 8/2022 | Goto |

| | | | |
|---|---|---|---|
| 2012/0306886 A1* | 12/2012 | Bernard | G01R 13/029 |
| | | | 345/440.1 |
| 2014/0098104 A1* | 4/2014 | Kirknel | G06T 11/206 |
| | | | 345/440.2 |
| 2021/0376852 A1 | 12/2021 | Guezelarslan et al. | |

FOREIGN PATENT DOCUMENTS

| | | | |
|---|---|---|---|
| CN | 104796207 A | * | 7/2015 |

OTHER PUBLICATIONS

"Spectrogram," Wikipedia, https://en.wikipedia.org/wiki/Spectrogram, Jun. 8, 2023, pp. 1-7.
"Surveyor 4D Software," Keysight, https://www.keysight.com/jp/ja/assets/7018-03907/technical-overviews/5991-2242.pdf, May 23, 2023, pp. 1-4.

(Continued)

*Primary Examiner* — Jeffery A Brier

(57) ABSTRACT

A circuit for processing data for radio frequency (RF) spectrum signals includes an input interface; a controller includes a controller memory that stores instructions. A processor executes the instructions, causing a circuit to: obtain representative RF feature vectors of pre-sorted cluster information for the RF spectrum signals via the input interface; group the representative RF feature vectors of the pre-sorted cluster information for the RF spectrum signals into final clusters for the RF spectrum signals; compute representative RF feature vectors for the final clusters for the RF spectrum signals; determine signal occupancy of each final cluster within a corresponding set display time for each of the RF spectrum signals; and generate visualization data for each final cluster for the RF spectrum signals for a display in accordance with the signal occupancy within the corresponding set display time for the RF spectrum signals.

20 Claims, 10 Drawing Sheets

(56)             References Cited

OTHER PUBLICATIONS

Masaharu Goto et al., "Effective Detection of Rare Anomalies from Massive Waveform Data Using Heterogeneous Clustering," 2020 IEEE International Conference on Big Data (Big Data), Atlanta, GA, USA, 2020, pp. 1513-1522.

Masaharu Goto et al., "Scaling Up Heterogeneous Waveform Clustering for Long-Duration Monitoring Signal Acquisition, Analysis, and Interaction: Bridging Big Data Analytics with Measurement Instrument Usage Pattern," 019 IEEE International Conference on Big Data (Big Data), Los Angeles, CA, USA, 2019, pp. 1794-1803.

* cited by examiner

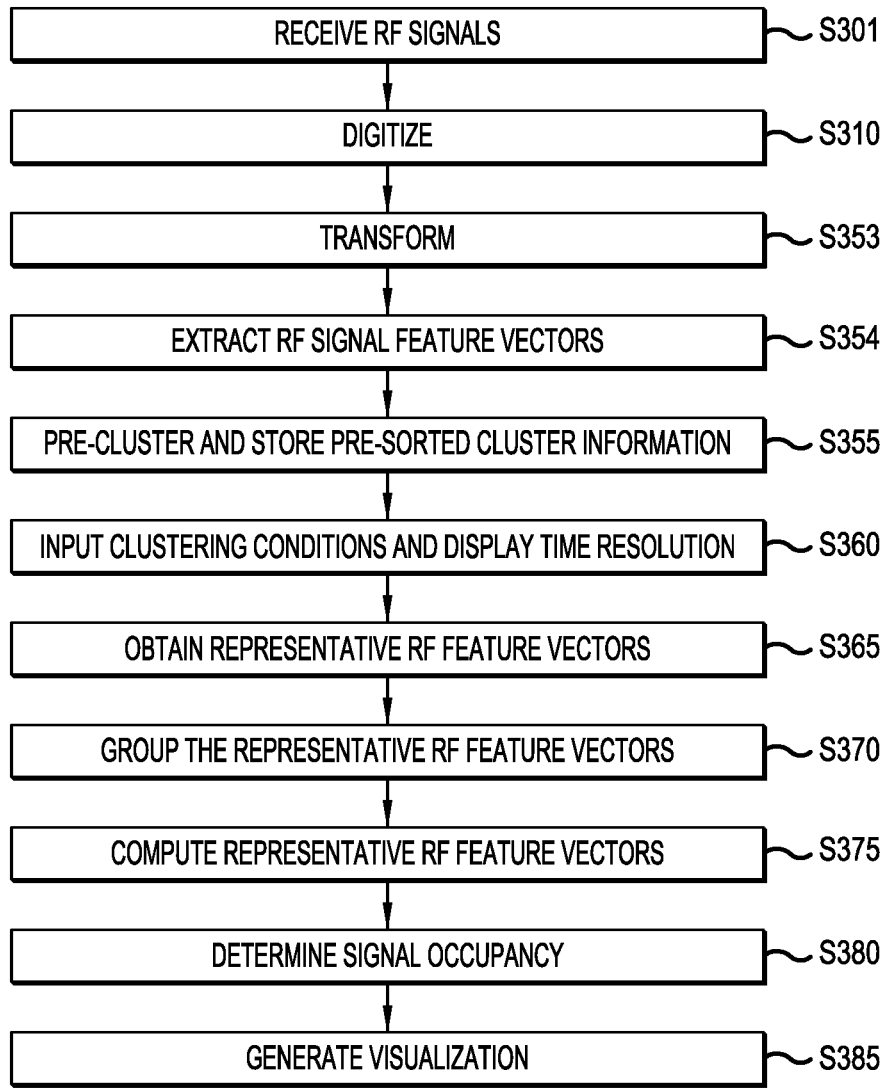

| RECEIVE RF SIGNALS | ~S301 |

| DIGITIZE | ~S310 |

| TRANSFORM | ~S353 |

| EXTRACT RF SIGNAL FEATURE VECTORS | ~S354 |

| PRE-CLUSTER AND STORE PRE-SORTED CLUSTER INFORMATION | ~S355 |

| INPUT CLUSTERING CONDITIONS AND DISPLAY TIME RESOLUTION | ~S360 |

| OBTAIN REPRESENTATIVE RF FEATURE VECTORS | ~S365 |

| GROUP THE REPRESENTATIVE RF FEATURE VECTORS | ~S370 |

| COMPUTE REPRESENTATIVE RF FEATURE VECTORS | ~S375 |

| DETERMINE SIGNAL OCCUPANCY | ~S380 |

| GENERATE VISUALIZATION | ~S385 |

FIG.3

LONG DURATION BROADBAND RF SPECTRUM SIGNAL VISUALIZATION

BACKGROUND

Spectrograms have been used to visualize broadband radio frequency (RF) spectrum signals over time. A spectrogram is a two-dimensional (2D) chart that assigns one of an X axis or a Y axis as frequency and the other of the X axis or Y axis as time. Colors may be used to represent signal intensity for coordinate positions. An example spectrogram for voice may assign the X axis as time and the Y axis as frequency. However, for an RF spectrogram it is common to assign the X axis as frequency and the Y axis as time.

Long duration broadband RF spectrum signals are not practically represented in spectrograms for several reasons. One reason is that long duration broadband RF spectrum signals are represented by large volumes of data that cannot be realistically read quickly, subject to processing such as with a fast Fourier transformation (FFT), and displayed. Another reason is that long duration broadband RF spectrum signals typically do not provide enough time resolution to visualize short pulse signals. For example, if 60 minutes is set as a display range for a signal with 10 us pulse width in a 60 min recording, 10 us is only 2.7e-9 of the range and is impractically small to visualize. Moreover, representing multiple of these narrow pulses graphically is an essential challenge. Technology enabling visualization of such small occurrence in much larger scale is a general challenge which is not limited to RF signals, but the concept can be extended to many problem domains with extraordinarily large differences in quantity in extraordinarily large amounts of data.

Instead of recording complete broadband RF spectrum signals, one technology extracts broadband RF spectrum signal features such as frequency, bandwidth, intensity, and/or pulse width from broadband RF spectrum signals, and stores the extracted broadband RF spectrum signal features in a relational database. The relational database can be queried for specific parts of extracted broadband RF spectrum signals which can be visualized in various charts. For example, a query can be made based on a specific value or range of a particular signal feature or combination of multiple signal features. With this technology, it is possible to visualize long duration broadband RF spectrum signals. However, the speed of relational databases limits throughput of data recording and analysis such that it takes a long time to store and analyze the long duration broadband RF spectrum signals.

SUMMARY

According to an aspect of the present disclosure, a circuit for processing data for RF spectrum signals includes an input interface and a controller. The includes a controller memory that stores instructions; and a processor that executes the instructions. When executed by the processor, the instructions cause the circuit to: obtain representative RF feature vectors of pre-sorted cluster information for the RF spectrum signals via the input interface; group the representative RF feature vectors of the pre-sorted cluster information for the RF spectrum signals into final clusters for the RF spectrum signals; compute representative RF feature vectors for the final clusters for the RF spectrum signals; determine signal occupancy of each final cluster within a corresponding set display time for each of the RF spectrum signals; and generate visualization data for each final cluster for the RF spectrum signals for a display in accordance with the signal occupancy within the corresponding set display time for the RF spectrum signals.

According to another aspect of the present disclosure, a system for processing and displaying data for RF spectrum signals includes a vector signal analyzer comprising a display; an input interface; and a controller. The controller includes a controller memory that stores instructions; and a processor that executes the instructions. When executed by the processor, the instructions cause the system to: obtain representative RF feature vectors of pre-sorted cluster information for the RF spectrum signals via the input interface; group the representative RF feature vectors of the pre-sorted cluster information for the RF spectrum signals into final clusters for the RF spectrum signals; compute representative RF feature vectors for the final clusters for the RF spectrum signals; determine signal occupancy of each final cluster within a corresponding set display time for each of the RF spectrum signals; and generate a visualization of each final cluster for the RF spectrum signals for the display of the vector signal analyzer in accordance with the signal occupancy within the corresponding set display time for the RF spectrum signals.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3 illustrates a method for long duration broadband RF spectrum visualization, in accordance with a representative embodiment.

DETAILED DESCRIPTION

Figure 1:
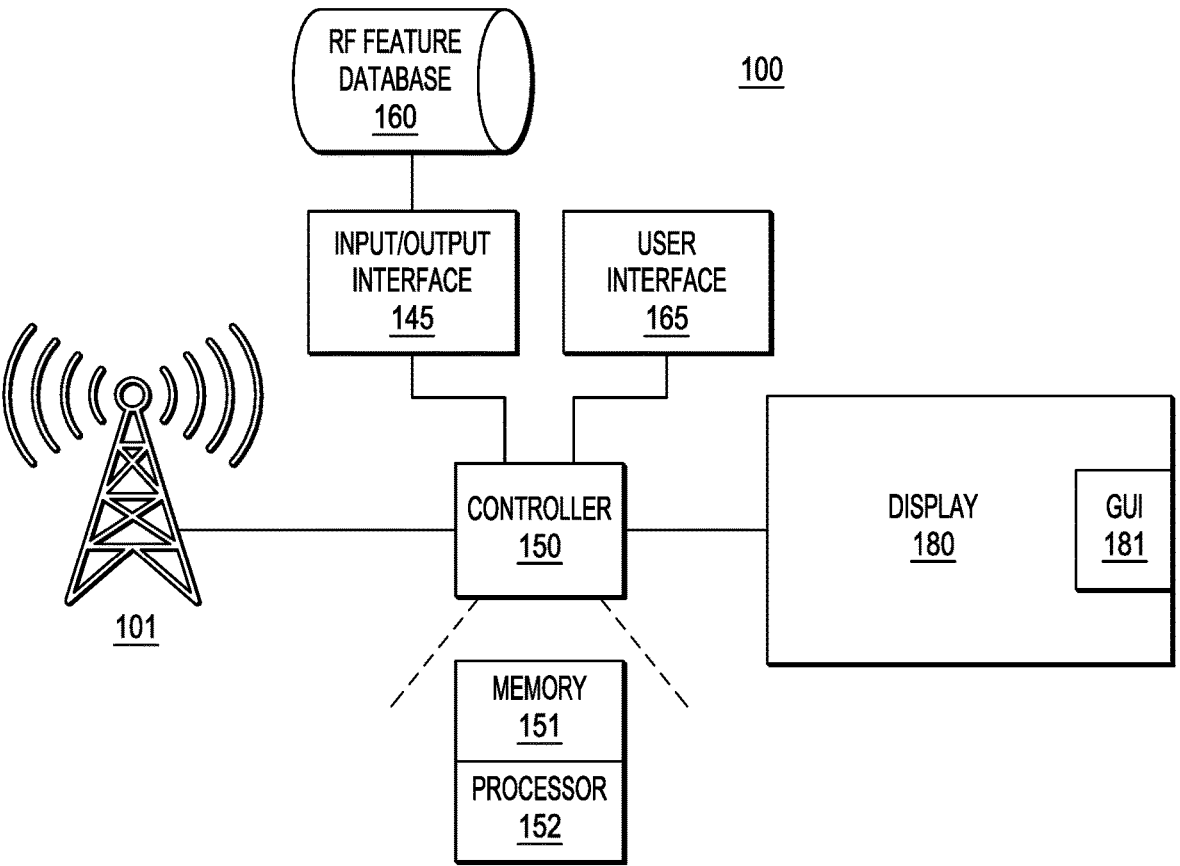
FIG. 1 illustrates a system for long duration broadband RF spectrum visualization, in accordance with a representative embodiment.

In the following detailed description, for the purposes of explanation and not limitation, representative embodiments disclosing specific details are set forth in order to provide a thorough understanding of embodiments according to the present teachings. However, other embodiments consistent with the present disclosure that depart from specific details disclosed herein remain within the scope of the appended claims. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. Definitions and explanations for terms herein are in addition to the technical and scientific meanings of the terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below.

As described herein, long duration broadband RF spectrum signals may be analyzed and visualized using a controller that selectively reduces the amount of data processed to generate the visualization. The long duration broadband RF spectrum signals may comprise signals in the frequency spectrum around and above one gigahertz (GHz), and such long duration broadband RF spectrum signals may be recorded and analyzed quickly, such as in real-time or near real-time notwithstanding the large amounts of raw data derived originally from and representative of the long duration broadband RF spectrum signals.

FIG. 1 illustrates a system 100 for long duration broadband RF spectrum visualization, in accordance with a representative embodiment.

The system 100 in FIG. 1 is a system for long duration broadband RF spectrum visualization and includes components that may be provided together or that may be distributed. The system 100 includes an RF source 101, an input/output interface 145, an RF feature database 160, a user interface 165 and a display 180. The controller 150 includes a memory 151 and a processor 152. The display 180 includes a graphical user interface 181.

The input/output interface 145 may be part of or connected to the RF feature database 160 or the controller 150. The input/output interface 145 writes to and reads from the RF feature database 160. The input/output interface 145 is used by the controller 150 to obtain representative RF feature vectors of pre-sorted cluster information for RF spectrum signals from the RF feature database 160. One or more representative RF feature vector may be read by the controller 150 from the RF feature database 160 via the input/output interface 145 for each pre-sorted cluster. The RF feature vectors may be derived from long broadband RF spectrum signals analyzed in real-time or in near real-time, such as in a testing context when testing a device under test (DUT).

The controller 150 may obtain representative RF feature vectors of pre-sorted cluster information for the RF spectrum signals from the RF feature database 160 via the input/output interface 145. The controller 150 may include additional interfaces, such as a first interface, a second interface, a third interface, and a fourth interface. One or more of the input/output interfaces 145, the user interface 165 and/or any additional interfaces of the controller 150 and/or the display 180 may include ports, disk drives, wireless antennas, or other types of receiver circuitry that connect the controller 150 to other electronic elements. The user interface 165 and one or more of any additional interfaces of the controller 150 or the display 180 may also include user interfaces such as buttons, keys, a mouse, a microphone, a speaker, a display separate from the display 180, or other elements that users can use to interact with the controller 150 such as to enter instructions and receive output.

The controller 150 may also be configured to group the representative RF feature vectors of pre-sorted cluster information for the RF spectrum signals received via the input/output interface 145 into final clusters for the RF spectrum signals. The grouping by the controller 150 may be in accordance with a user input or system setting comprising a final clustering condition, and the grouping may be performed by the controller 150 to reduce the number of clusters in accordance with an algorithm to obtain a final clustering result. User input may be provided via the user interface 165. Grouping of the representative RF feature vectors may be performed by the controller 150 in accordance with one or more input clustering condition(s) input via the user interface 165 and including a number of target final clusters, weight vectors for parameters of the RF feature vectors, and/or a time-frequency range. The controller 150 may further be configured to compute one or more representative RF feature vectors for the final clusters for the RF spectrum signals. An amount of data of the final clusters for the RF spectrum signals may be less than an amount of data for the representative RF feature vectors of the pre-sorted cluster information for the RF spectrum signals.

The controller 150 may be implemented in or as an accessory to a vector signal analyzer (VSA) and/or vector network analyzer (VNA). The controller 150 may also be configured to determine signal occupancy of each final cluster within a corresponding set display time for each of the RF spectrum signals. The signal occupancy represents a relative amount of time during which signals in a cluster are present during a period between a first time and a second time. The signal occupancy of each final cluster may be set in accordance with a user input or system setting comprising a display time resolution. The signal occupancy may be computed based on the controller 150 scanning the RF feature database 160 as a database memory with the representative RF feature vector for the final cluster result.

The controller 150 may also be configured to generate visualizations for each final cluster for the RF spectrum signals for the display 180 in accordance with the signal occupancy within the corresponding set display time for the RF spectrum signals. The controller 150 is configured to generate visualization data for each final cluster for the RF spectrum signals for the display 180 in accordance with the signal occupancy within the corresponding set display time for the RF spectrum signals. A visualization of each final cluster for the RF spectrum signals is thus generated by the controller 150 reading pre-sorted clusters from the RF feature database 160 to visualize a long duration RF spectrogram.

The controller 150 may perform some of the operations described herein directly and may implement other operations described herein indirectly. For example, the controller 150 may indirectly control operations such as by generating and transmitting content to be displayed on the display 180. The controller 150 may directly control other operations such as logical operations performed by the processor 152 executing instructions from the memory 151 based on input received from electronic elements and/or users via the interfaces. Accordingly, the processes implemented by the controller 150 when the processor 152 executes instructions from the memory 151 may include steps not directly performed by the controller 150.

As illustrated in FIG. 1, the controller 150 of the system 100 includes a processor 152. The processor 152 may be considered a representative example of a processor of a controller and executes instructions to implement some or all aspects of methods and processes described herein. The processor 152 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 152 is an article of manufacture and/or a machine component. The processor 152 is configured to execute software instructions to perform functions as described in the various embodiments herein. The processor 152 may be a general-purpose processor or may be part of an application specific integrated circuit (ASIC). The processor 152 may also be a microprocessor, a microcomputer, a processor chip, a controller, a microcontroller, a digital signal processor (DSP), a state machine, or a programmable logic device. The processor 152 may also be a logical circuit, including a programmable gate array (PGA), such as a field programmable gate array (FPGA), or another type of circuit that includes discrete gate and/or transistor logic. The processor 152 may be a central processing unit (CPU), a graphics processing unit (GPU), or both. Additionally, any processor described herein may include multiple processors, parallel processors, or both. Multiple processors may be included in, or coupled to, a single device or multiple devices. The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

As also illustrated in FIG. 1, the controller 150 of the system 100 further includes a memory 151. The memory 151 may be representative of more than one memory such as a main memory and a static memory, where memories in the controller 150 communicate with each other and the processor 152 via a bus. Either or both of the main memory and the static memory may be considered representative examples of a memory of the controller 150, and store instructions used to implement some or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory and the static memory are articles of manufacture and/or machine components. The main memory and the static memory are computer-readable mediums from which data and executable software instructions can be read by a computer (e.g., the processor 152). Each of the main memory and the static memory may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blue-ray disk, or any other form of storage medium known in the art. The memories may be volatile or non-volatile, secure and/or encrypted, unsecure and/or unencrypted. "Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

The display 180 may be standalone or may be a component of a networked element such as a vector signal analyzer (VSA) or a vector network analyzer (VNA). When implemented as a component of a networked element such as a vector signal analyzer, the display 180 may be provided with another controller separate from the controller 150 but with elements such as the memory 151 that stores instructions and the processor 152 that executes the instructions. The display 180 may be local to the controller 150 or may be remotely connected to the controller 150. The display 180 may be connected to the controller 150 via a local wired interface such as an Ethernet cable or via a local wireless interface such as a Wi-Fi connection. The display 180 may be interfaced with other user input devices by which users can input instructions, including mouses, keyboards, thumb-wheels and so on. The display 180 may be a monitor such as a computer monitor, a display on a mobile device, an augmented reality display, a television, an electronic white-board, or another screen configured to display electronic imagery. The display 180 may also include one or more input interface(s) such as those noted above that may connect to other elements or components, as well as an interactive touch screen configured to display prompts to users and collect touch input from users.

In embodiments based on FIG. 1, the controller 150 includes a memory 151 that stores instructions and a pro-cessor 152 that executes the instructions. However, in embodiments described below with respect to at least FIG. 2 and FIG. 4, some of the functionality attributed to software executed by the controller 150 in FIG. 1 may be performed by specific circuits such as field programming gate arrays (FPGAs) and application-specific integrated circuits (ASICs). Such specific circuits will in some instances be referenced as sub-circuits, though some functionality attrib-uted to sub-circuits may in turn be implemented by software executed by a controller such as the controller 150 in FIG. 1.

Figure 2:
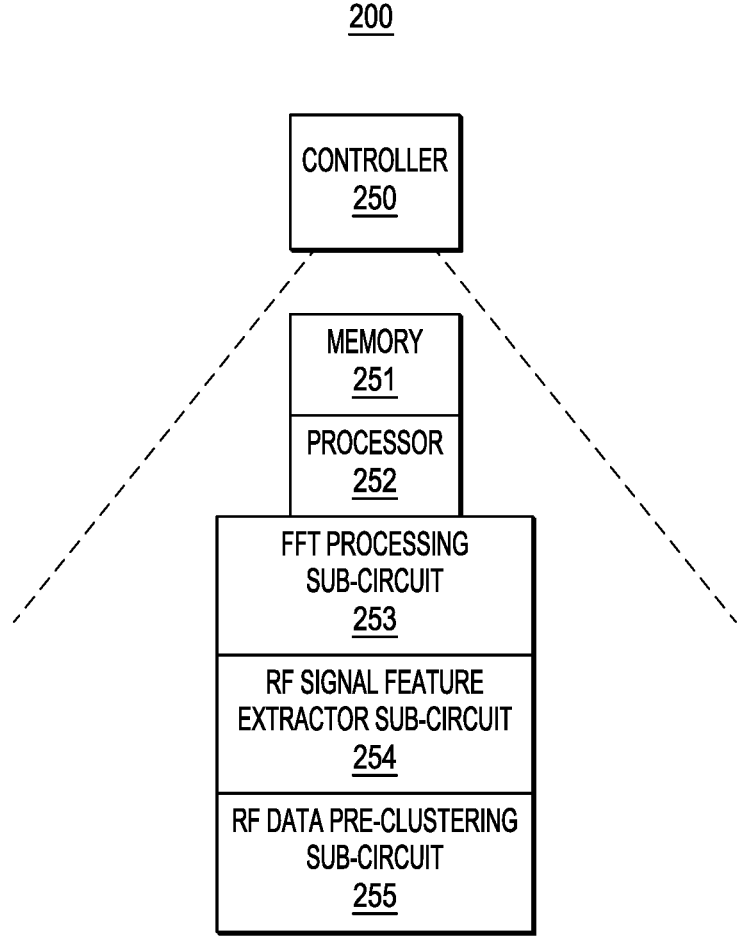
FIG. 2 illustrates a circuit for long duration broadband RF spectrum visualization, in accordance with a representative embodiment.

FIG. 2 illustrates a circuit for long duration broadband RF spectrum visualization, in accordance with a representative embodiment.

The circuit 200 of FIG. 2 includes a controller 250. The controller 250 includes a memory 251 that stores instruc-tions, a processor 252 that executes the instructions, a FFT processing sub-circuit 253, an RF spectrum signal feature extractor sub-circuit 254, and an RF data pre-clustering sub-circuit 255. In the circuit 200 of FIG. 2, rather than a memory/processor combination, some of the functions implemented by the controller 250 may be performed pri-marily or entirely by circuits such as field programmable gate arrays (FPGAs) or other forms of application-specific integrated circuits (ASICs), including the FFT processing sub-circuit 253, the RF spectrum signal feature extractor sub-circuit 254, and the RF data pre-clustering sub-circuit 255. For example, the FFT processing sub-circuit 253 per-forms a fast Fourier transform on digitizations of IQ data based on a received RF spectrum signal. The RF data pre-clustering sub-circuit 255 is configured to group RF features into pre-sorted clusters based on similarity. The RF spectrum signal feature extractor sub-circuit 254 is config-ured to detect transformed signals above a predefined thresh-old level and extract RF features grouped by the RF data pre-clustering sub-circuit 255.

The FFT processing sub-circuit 253 in FIG. 2 is imple-mented as a hardware circuit. However, FFT processing may also be implemented by software executed by a processor such as by the processor 152 in the controller 150 in FIG. 1. The FFT processing sub-circuit 253 implemented as hard-ware circuit in FIG. 2 may operate faster than a software version implemented by a memory/processor combination, such as insofar as a memory/processor combination in a controller such as the controller 150 may be tasked with many different processes to run in parallel.

The RF spectrum signal feature extractor sub-circuit 254 in FIG. 2 is also implemented as a hardware circuit. How-ever, the RF spectrum signal feature extraction may also be implemented by software executed by a processor such as by the processor in the controller 150 in FIG. 1. The RF spectrum signal feature extractor sub-circuit 254 imple-mented as a hardware circuit in FIG. 2 may operate faster than a software version implemented by a memory/proces-sor combination, such as insofar as insofar as a memory/processor combination in a controller such as the controller 150 may be tasked with many different processes to run in parallel.

The RF data pre-clustering sub-circuit 255 in FIG. 2 is also implemented as a hardware circuit. However, the RF data pre-clustering may also be implemented by software such as by the controller 150 in FIG. 1. The RF data pre-clustering sub-circuit 255 in FIG. 2 may comprise a complicated sub-circuit, such that implementation as soft-ware executed by the controller 150 in FIG. 1 or the processor 252 of the controller 250 in FIG. 2 may minimize complications and operate faster and more efficiently.

Teachings of embodiments based on FIG. 1 and FIG. 2 may be fully or partially combined in some embodiments. For example, the controller 150 and the controller 250 may be combined or may provided separately. A visualization process implemented using the RF feature database 160, and the elements from the input interface 145 through the graphical user interface 181 may be implemented after completion of database generation using the RF source 101, the controller 250 and the RF feature database 160. That is, the database may be generated first and the visualization process may occur later.

FIG. 3 illustrates a method for long duration broadband RF spectrum visualization, in accordance with a represen-tative embodiment.

The method of FIG. 3 begins at S301 with receiving RF spectrum signals. The RF spectrum signals may be received via the RF source 101 in FIG. 1 and then received at the controller 150 and/or the RF feature database 160.

At S310, the received RF spectrum signals are digitized. The digitization of the RF spectrum signals at S310 may be performed by an analog-to-digital converter (ADC), such as between the RF source 101 and the controller 150 in FIG. 1.

At S353, the digitized RF spectrum signals are trans-formed. The transform at S353 may be performed by the processor 152 of the controller 150 in FIG. 1, the FFT processing sub-circuit 253 of the controller 250 in FIG. 2, or by a fast Fourier transform (FFT) processing sub-circuit 453 shown in and explained below with respect to FIG. 4. The FFT processing sub-circuit 253 in FIG. 2 and/or the fast Fourier transform (FFT) processing sub-circuit 453 in FIG. 4 may be implemented by circuitry such as a field program-mable gate array (FPGA).

At S354, RF spectrum signal feature vectors are extracted from the transformed RF spectrum signals. The extraction at S354 may be performed by the controller 150 in FIG. 1, the RF spectrum signal feature extractor sub-circuit 254 of the controller 250 in FIG. 2, or by an RF spectrum signal feature extractor sub-circuit 454 shown in and explained below with respect to FIG. 4. The RF spectrum signal feature extractor sub-circuit 254 in FIG. 2 and/or the RF spectrum signal feature extractor sub-circuit 454 in FIG. 4 may be imple-mented by circuitry such as a field programmable gate array (FPGA).

At S355, pre-clustering is performed on the extracted RF spectrum signal feature vectors, and the pre-sorted cluster information is stored. The pre-clustering at S355 may be performed by the processor 152 of the controller 150 in FIG. 1, the processor 252 of the controller 250 in FIG. 2, of by a processor that implements the long duration RF spectrum signal visualization sub-circuit 461 in FIG. 4. The pre-sorted cluster information may be stored in the RF feature database 160 in FIG. 1 or a database memory 460 shown in and explained below with respect to FIG. 4. A controller such as the controller 150 may obtain the pre-sorted cluster information from the RF feature database 160 via the input/output interface 145.

At S360, clustering conditions are input and time resolution is displayed. Each set display time may be set in accordance with display time resolution input via a user interface. The clustering conditions may be input by a user interface such as the user interface 165 in FIG. 1. The display of the time resolution may be provided on the display 180 as in FIG. 1 or on a display of a vector signal analyzer (VSA). Clustering based on the clustering conditions at S360 is separate from and performed after the pre-clustering at S355.

At S365, representative RF feature vectors are obtained. Obtaining the representative RF feature vectors at S365 may be performed by the processor 152 of the controller 150 in FIG. 1, the processor 252 of the controller 250 in FIG. 2, of by a processor that implements the long duration RF spectrum signal visualization sub-circuit 461 in FIG. 4.

At S370, the representative RF feature vectors obtained based on the clustering conditions input at S360 are grouped. Grouping of the representative RF feature vectors at S370 may be performed by the processor 152 of the controller 150 in FIG. 1, the processor 252 of the controller 250 in FIG. 2, of by a processor that implements the long duration RF spectrum signal visualization sub-circuit 461 in FIG. 4.

Figure 7:
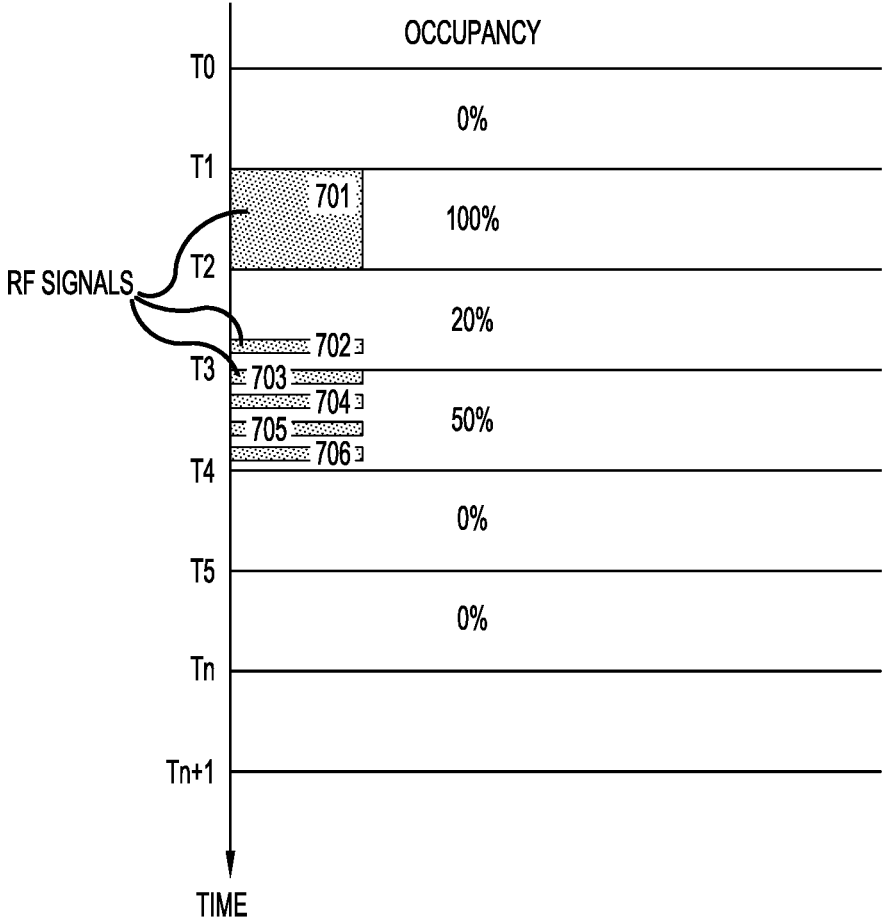
FIG. 7 illustrates signal occupancy for long duration broadband RF spectrum visualization, in accordance with a representative embodiment.
Figure 8:
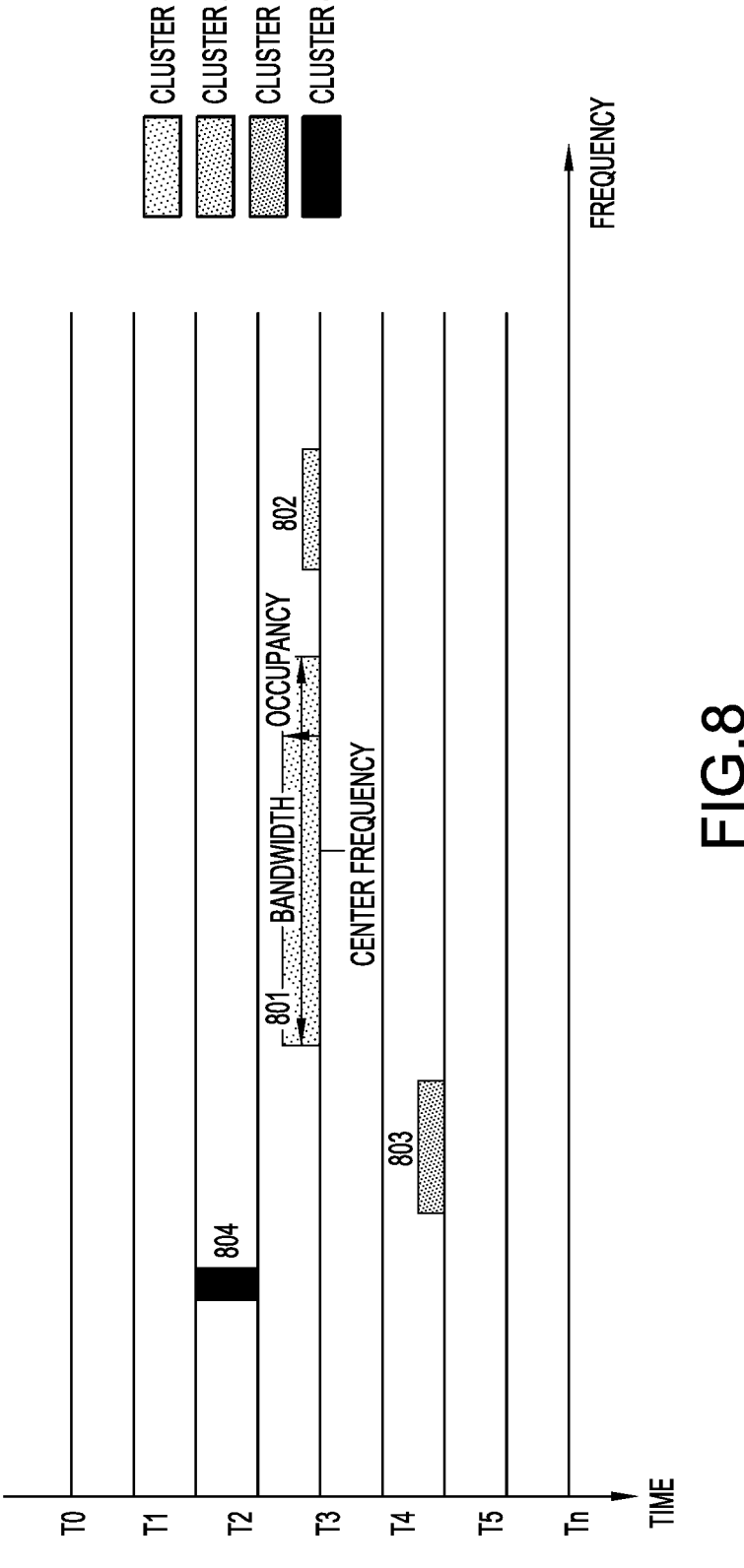
FIG. 8 illustrates a signal cluster diagram for long duration broadband RF spectrum visualization, in accordance with a representative embodiment.

At S380, signal occupancy is determined. Signal occupancy may be determined at S380 by the processor 152 of the controller 150 in FIG. 1, the processor 252 of the controller 250 in FIG. 2, of by a processor that implements the long duration RF spectrum signal visualization sub-circuit 461 in FIG. 4. Signal occupancy is illustrated in FIG. 8, and detailed more in the context of FIG. 7 and FIG. 8.

At S385, a visualization is generated. The visualization may be generated at S385 by the controller 150 in FIG. 1 or the controller 250 in FIG. 2 reading pre-sorted clusters from a database memory such as the database memory to visualize a long duration RF spectrogram. Visualization data generated by the controller 150 or the controller 250 for each final cluster for RF spectrum signals may be generated in accordance with signal occupancy within a corresponding set display time for the RF signals. The visualization data may be configured to generate a visualization for the RF spectrum signals comprising a visualization of a long duration RF spectrogram for the RF spectrum signals Signal occupancy in the long duration RF spectrogram may be provided as a representation of the relative prevalence of signal components in the long duration RF spectrogram.

Figure 4:
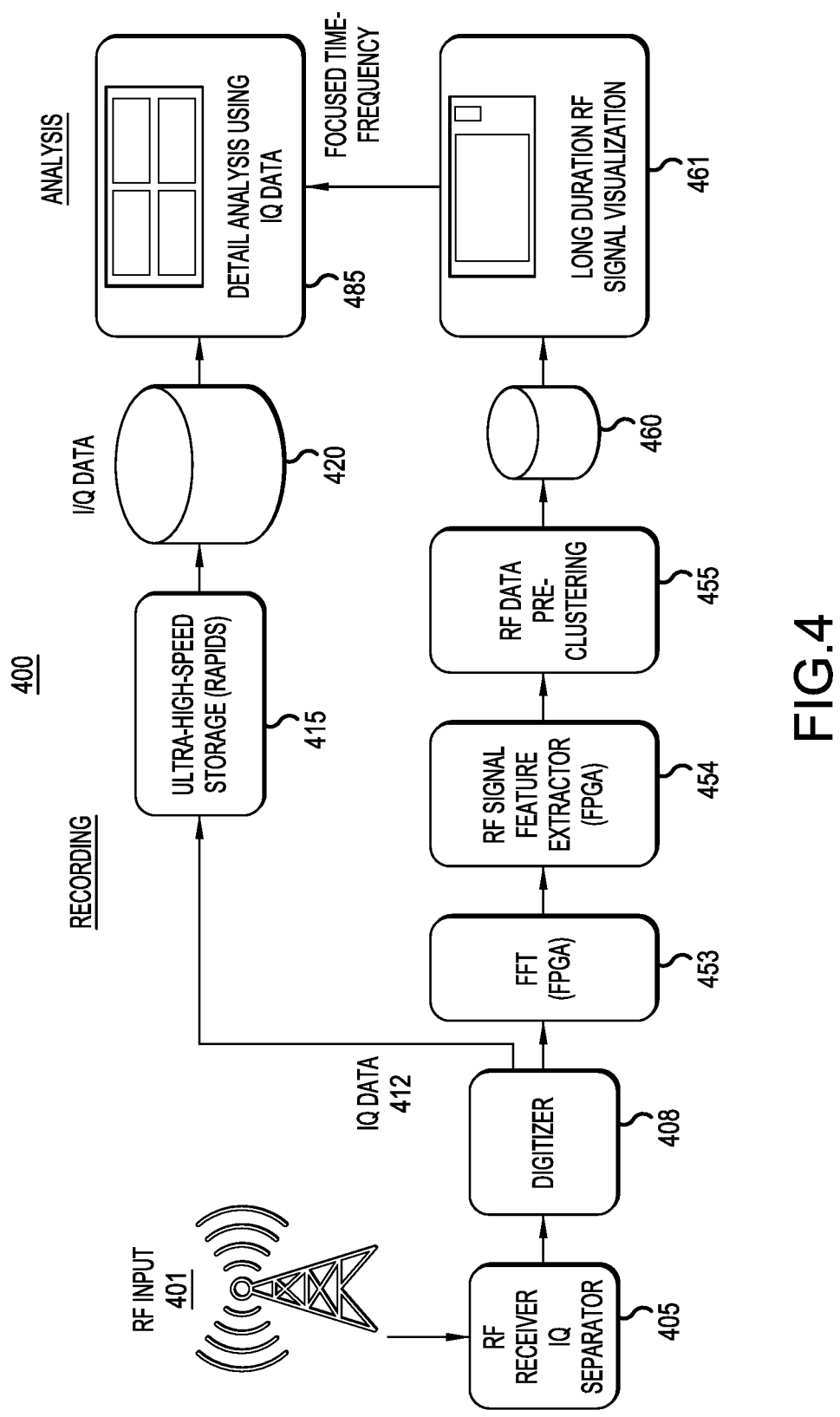
FIG. 4 illustrates another system for long duration broadband RF spectrum visualization, in accordance with a representative embodiment.

FIG. 4 illustrates another system for long duration broadband RF spectrum visualization, in accordance with a representative embodiment.

The system 400 is a block diagram and includes an RF input source 401, an RF receiver 405 with an IQ separator, a digitizer 408, a fast Fourier transform (FFT) processing sub-circuit 453, an RF spectrum signal feature extractor sub-circuit 454, an RF data pre-clustering sub-circuit 455, a database memory 460, a long duration RF spectrum signal visualization sub-circuit 461, an ultra-high-speed storage 415, an IQ data storage 420, and an analysis module 485.

The RF input source 401 may comprise a receiver such as an antenna for RF spectrum signals in a test environment, such as in an anechoic chamber. The RF spectrum signal captured by the RF input source 401 is sent to the RF receiver 405. The RF receiver 405 may comprise a test receiver of a testing system. The RF receiver 405 is configured as an IQ separator that separates the received RF spectrum signals from the RF input source 401 into IQ components.

The digitizer 408 may comprise an analog-to-digital converter (ADC). The digitizer 408 converts the IQ data from the RF receiver 405 into digital IQ data 412. The digital IQ data 412 is sent from the digitizer 408 to the ultra-high-speed storage 415 and to the fast Fourier transform (FFT) processing sub-circuit 453. The digital IQ data 412 is derived from radio frequency signals transmitted by the RF input source 401 and received by the RF receiver 405.

The fast Fourier transform (FFT) processing sub-circuit 453 may comprise a field programmable gate array (FPGA), an application-specific integrated circuit (ASIC), a digital signal processor (DSP) or by software stored in a memory of a controller such as the controller 150 in FIG. 1. The fast Fourier transform (FFT) processing sub-circuit 453 is configured to transform digitized RF spectrum signals into transformed signals detected by the RF spectrum signal feature extractor sub-circuit 454.

The RF spectrum signal feature extractor sub-circuit 454 is configured to detect transformed signals from the fast Fourier transform (FFT) processing sub-circuit 453 and extract features to be grouped by the RF data pre-clustering sub-circuit 455. The RF spectrum signal feature extractor sub-circuit 454 may use a predefined threshold so as to detect transformed signals above a predefined threshold. The RF spectrum signal feature extractor sub-circuit 454 may detect signals above a predefined threshold level and extract signal features, such as time, frequency, amplitude, bandwidth, and/or pulse width to obtain an RF feature vector. The RF spectrum signal feature extractor sub-circuit 454 may extract RF feature vectors from the RF spectrum signals including at least one of frequency, bandwidth, intensity, or pulse width. RF feature vectors may comprise relatively simple numerical vector representations with values in one digit such as five or in two digits such as twenty.

The RF data pre-clustering sub-circuit 455 is configured to group RF features into pre-sorted clusters based on similarity. The RF data pre-clustering sub-circuit 455 may group RF features into pre-sorted clusters based on similarity computed by weighted Euclidean distance or another mathematical method. The pre-sorted cluster information may then be stored into the database memory 460.

The database memory 460 may be configured to store pre-sorted clusters grouped by the RF data pre-clustering sub-circuit 455 and time-population data for each pre-sorted cluster. The database memory 460 may comprise an RF feature database that stores the pre-sorted cluster information. The database memory 460 may comprise an RF feature database which contains representative RF feature vector and time-population of each pre-sorted cluster.

The long duration RF spectrum signal visualization sub-circuit 461 may comprise a controller such as the controller 150 in FIG. 1, and thus may comprise a memory that stores instructions and a processor that executes the instructions. The long duration RF spectrum signal visualization sub-circuit 461 in FIG. 4 may be implemented separate from a vector signal analyzer (VSA) or vector network analyzer (VNS), such as by a peripheral which can be connected to a vector signal analyzer or vector network analyzer. The long duration RF spectrum signal visualization sub-circuit 461 may be configured to generate visualization data for each final cluster for the RF spectrum signals for a display in accordance with the signal occupancy within the corresponding set display time for the RF spectrum signals. The long duration RF spectrum signal visualization sub-circuit 461 may be configured to execute a process that includes obtaining representative RF feature vectors of pre-sorted cluster information for the RF spectrum signals originally received by the RF receiver 405. The representative RF feature vectors of pre-sorted cluster information may be read from RF Feature database 160 through Input/Output interface 145 in FIG. 1. The long duration RF spectrum signal visualization sub-circuit 461 may also be configured to group the representative RF feature vectors of the pre-sorted cluster information for the RF spectrum signals into final clusters for the RF spectrum signals. The long duration RF spectrum signal visualization sub-circuit 461 may also be configured to compute representative RF feature vectors for the final clusters for the RF spectrum signals, and determine signal occupancy of each final cluster within a corresponding set display time for each of the RF spectrum signals. The long duration RF spectrum signal visualization sub-circuit 461 may be configured to also then generate the visualization data for each final cluster for the RF spectrum signals for a display in accordance with the signal occupancy within the corresponding set display time for the RF spectrum signals. The visualization for the RF spectrum signals provides a visualization of a long duration RF spectrogram for the RF spectrum signals. An amount of data of the final clusters for the RF spectrum signals is less than an amount of data for the representative RF feature vectors of the pre-sorted cluster information for the RF spectrum signals. Grouping of the representative RF feature vectors may be performed in accordance with input clustering conditions input via a user interface and including a number of target final clusters, weight vectors for parameters of the RF feature vectors, and a time-frequency range.

After the recording, the long duration RF spectrum signal visualization sub-circuit 461 reads pre-sorted clusters information from the database memory 460 to visualize a long duration RF spectrogram. The process of visualizing the long duration RF spectrogram is shown in and described below further with respect to FIG. 6.

As noted, the analysis module 485 may be representative of a vector signal analyzer comprising a display. A vector signal analyzer may include a computer system on which a some aspects of a method for long duration broadband RF spectrum visualization may be implemented, in accordance with another representative embodiment. The analysis module 485 may includes a controller with a memory that includes a set of software instructions that can be executed to cause the vector network analyzer to perform teachings attributable to the analysis module 485. The analysis module 485 may operate as a standalone device apart from the other elements in FIG. 4, and may be connected to the elements via wired and/or wireless connections.

As shown, the analysis module may include a video display unit, such as a liquid crystal display (LCD), an organic light emitting diode (OLED), a flat panel display, a solid-state display, or a cathode ray tube (CRT), for example. Additionally, the analysis module 485 may include an input device, such as a keyboard/virtual keyboard or touch-sensitive input screen or speech input with speech recognition, and a cursor control device, such as a mouse or touch-sensitive input screen or pad. The analysis module may also include a disk drive unit, a signal generation device, such as a speaker or remote control, and/or a network interface device. In an embodiment, a disk drive unit may include a computer-readable medium in which one or more sets of software instructions (software) are embedded. The sets of software instructions may be read from the computer-readable medium to be executed by the processor of the controller. Further, the software instructions, when executed by the processor of the controller of the analysis module 485, may perform one or more steps of the methods and processes as described herein.

Figure 5:
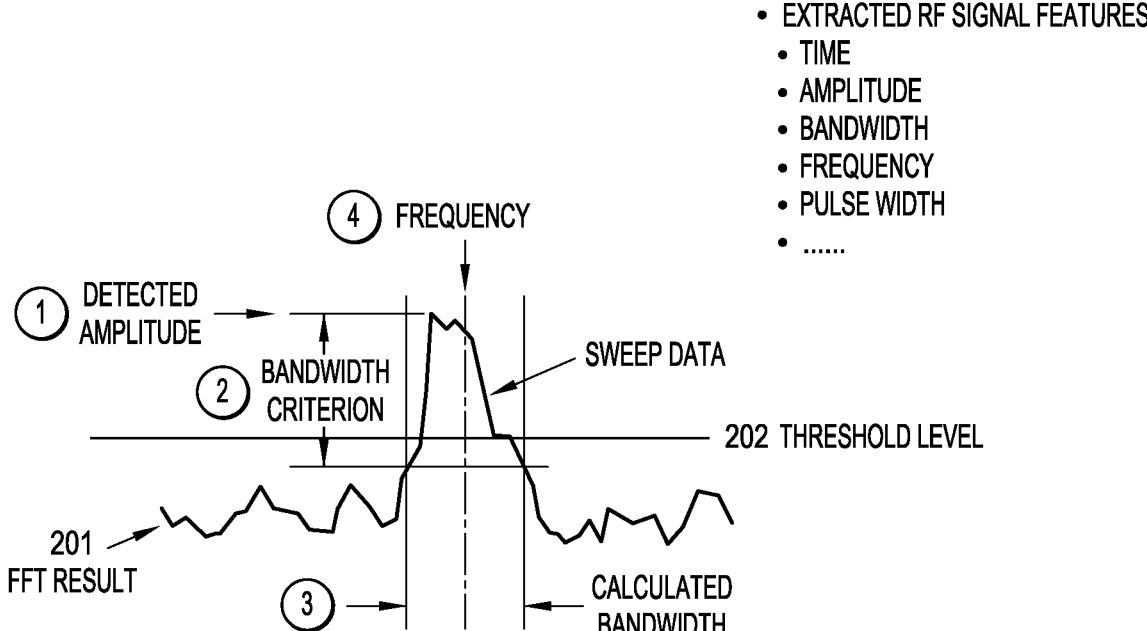
FIG. 5 illustrates RF spectrum signal feature extraction for long duration broadband RF spectrum visualization, in accordance with a representative embodiment.

FIG. 5 illustrates RF spectrum signal feature extraction for long duration broadband RF spectrum visualization, in accordance with a representative embodiment.

The visualization in FIG. 5 shows amplitude on the Y axis and frequency on the X axis. The extracted RF spectrum signal features in FIG. 5 include time, amplitude, bandwidth, frequency and pulse width. An FFT result 201 is provided as input to extract the RF spectrum signal features. An amplitude designated as "1" is detected as the maximum amplitude of the frequency "4", and is used as part of the bandwidth criterion "2" to define parameters for the sweep data. The calculated bandwidth "3" is derived between the envelope values at the lower frequency of the bandwidth criterion "2". That is, the calculated bandwidth "3" is calculated in accordance with the bandwidth criterion "2". The process of FIG. 5 is continued for multiple FFT results along with time to obtain timing parameters such as time and pulse width of a signal, and this is shown in and explained below with respect to FIG. 10. Additional RF spectrum signal features may be extracted. As shown, a threshold level 202 is used as a basis to reduce the volume of extracted RF features, so that components of the FFT result 201 may be eliminated from consideration for the visualization to be generated from visualization data resulting from processing the FFT result 201.

Figure 6:
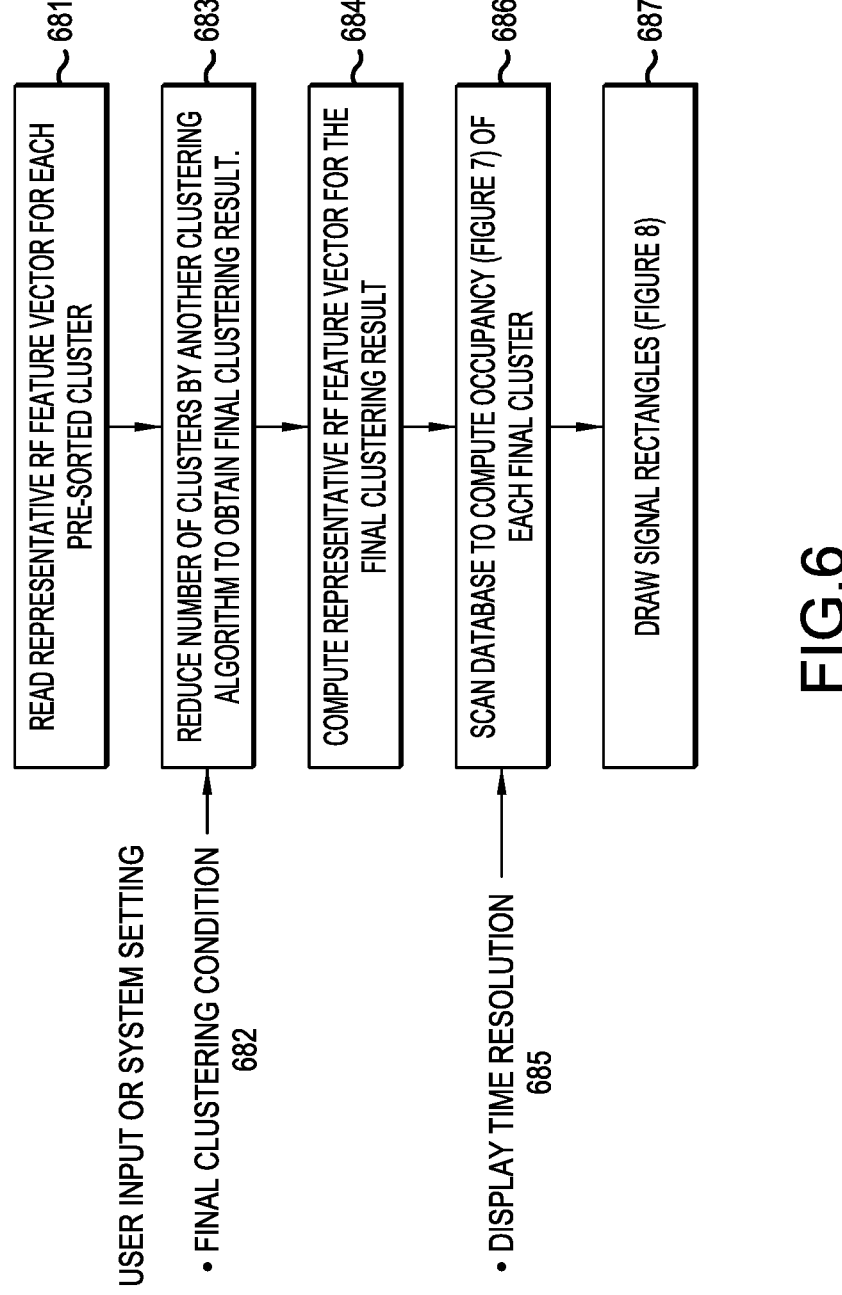
FIG. 6 illustrates another method for long duration broadband RF spectrum visualization, in accordance with a representative embodiment.

FIG. 6 illustrates another method for long duration broadband RF spectrum visualization, in accordance with a representative embodiment.

The method of FIG. 6 is performed to visualize signal occupancy for a long duration RF spectrum signal visualization process. At 681, a representative RF feature is read by the long duration RF spectrum signal visualization sub-circuit 461 for each pre-sorted cluster from the database memory 460. The representative RF feature may comprise a representative RF feature vector for each pre-sorted cluster.

At 683, the number of clusters is reduced by a clustering algorithm to obtain a final clustering result. The representative RF feature vectors read at 681 are grouped into final clusters by the long duration RF spectrum signal visualization sub-circuit 461. The final clustering result is obtained at 683 using a final clustering condition 682 which may be input dynamically by a user or which may be a preset system setting. 683 may be performed insofar as there may be many pre-sorted clusters to retain sufficient information in the database memory 460, so that the number of clusters can be reduced at 683. A final clustering condition may be provided by a user via a user interface. The final clustering condition may contain a number of target clusters to be reached in the final clustering. The final clustering condition may include a weight vector such as for RF feature parameters and/or time-frequency range. The weight vector may determine which RF features to focus on at the clustering at 683. As an example, if a non-zero value is assigned only in a dimension of amplitude, signals are clustered by amplitude. If non-zero values are assigned to multiple weight vector dimensions, signals are clustered by compound distances of those parameters.

At 684, a representative RF feature vector is computed for the final clustering result.

At 686, a database is scanned to compute occupancy of each final cluster. Signal occupancy of each final cluster may be within a display time resolution may be computed by scanning the database memory 460. The display time resolution may be provided from a user via a user interface. The occupancy may be computed using a display time resolution which may be input dynamically by a user or which may be a preset system setting. Occupancy is shown in and explained more with respect to FIG. 7 below. As shown in FIG. 7, if signals belonging to a certain cluster always exist during time duration T1 and T2, signal occupancy of the cluster in this time slot is 100%. If the signals exist only 20% in a time slot, occupancy is 20%.

Figure 9:
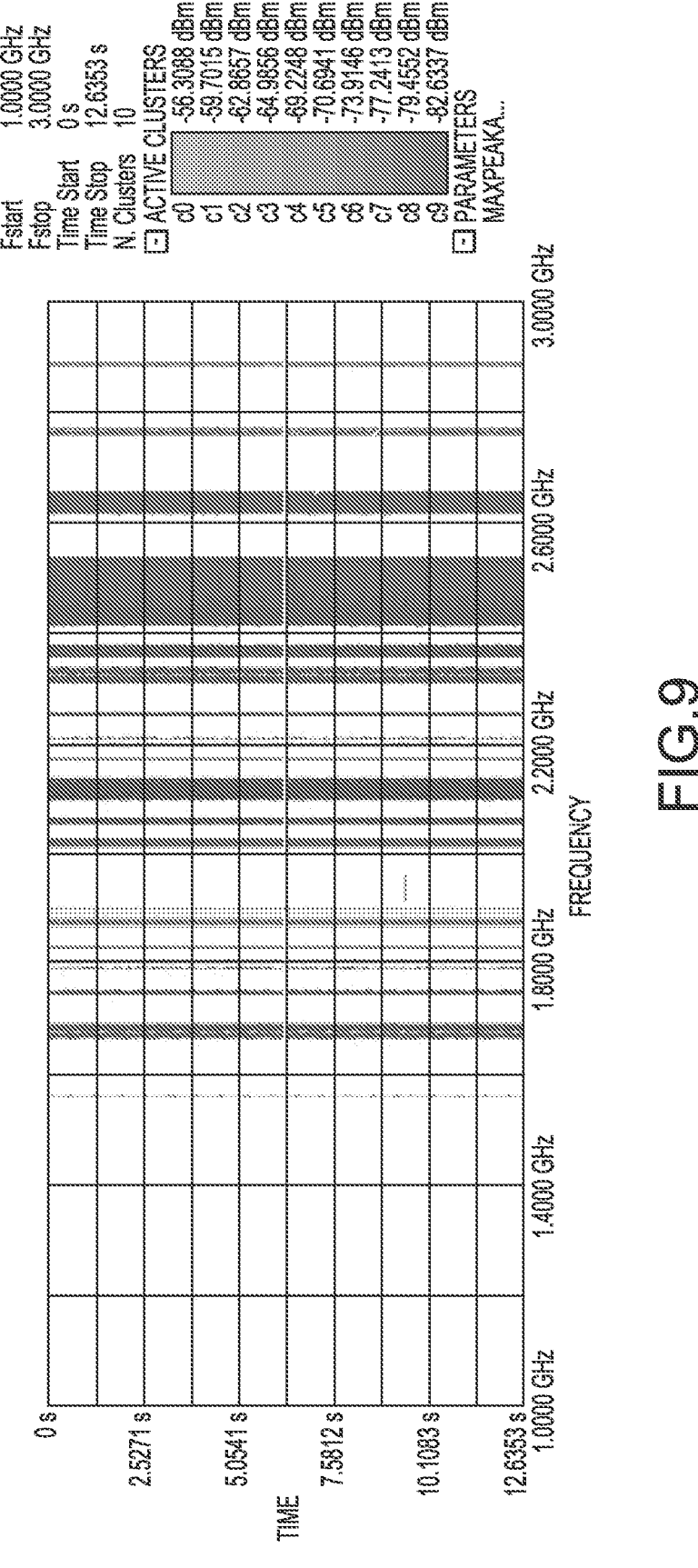
FIG. 9 illustrates signal clustering for long duration broadband RF spectrum visualization, in accordance with another representative embodiment.

At 687, signal rectangles are drawn or otherwise created for rendering on a display. A display of signal rectangles as drawn at 687 is shown in and explained with respect to FIG. 8 below. FIG. 8 shows how signal clusters are displayed. An RF spectrum signal cluster diagram is a 2-dimensional chart. X axis is assigned as frequency and Y axis is assigned as time. In each time slot, signal cluster information is drawn as a rectangle at a position of the center frequency and time occurrence. The rectangle height and width correspond to signal occupancy and bandwidth. Non-linear scaling, such as log scale, may be used for the height of the signal rectangles to display small occupancy clearly insofar as a signal with a small occupancy such as 1% may otherwise be difficult to find due to limited display resolution. Color and/or intensity may be used to represent the cluster. In FIG. 8, 801 belongs to the first cluster, 802 belongs to the second cluster, 803 belongs to the third cluster, and 804 belongs to the fourth cluster. FIG. 9 is an actual example of the RF spectrum signal cluster chart which look similar to the traditional spectrogram. An actual visualization of an RF spectrum signal cluster chart may be provided with an ability to zoom-in to a specific time-frequency range.

FIG. 7 illustrates signal occupancy for long duration broadband RF spectrum visualization, in accordance with a representative embodiment.

In FIG. 7, signal occupancy is shown for six RF spectrum signals in a specific bandwidth or at a specific frequency in FIG. 7. As shown, the first signal 701 has 100% signal occupancy between time T1 and time T2. The second signal 702, the third signal 703, the fourth signal 704, the fifth signal 705 and the sixth signal 706 have relatively smaller occupancy than the first signal 701, and at different times. In FIG. 7, the relative vertical location of signals is not particularly significant insofar as relative vertical location within a time slot represents a small time difference compared with a full time display range, and location within a single time slot is not particularly recognizable.

FIG. 8 illustrates a signal cluster diagram for long duration broadband RF spectrum visualization, in accordance with a representative embodiment.

As shown in FIG. 8, four clusters are showed as rectangles with frequency for the X axis and time for the Y axis. The first cluster 801 is representative, and represents a bandwidth with a center frequency. Occupancy is represented by the amount of time signals appeared in the cluster. The second cluster 802 is at a lower bandwidth than the first cluster 801, and has lower occupancy than the first cluster 801. The second cluster 802 also has a relatively smaller bandwidth than the first cluster 801. The third cluster 803 is observed later in time than the first cluster 801 and the second cluster 802, and has a lower bandwidth than the first cluster 801. The third cluster 803 also has a bandwidth about the same size as the second cluster 802, and relatively smaller bandwidth than the first cluster 801. The fourth cluster 804 is observed earlier in time than the first cluster 801, the second cluster 802, and the third cluster 803, and has the highest signal occupancy of the four clusters. The fourth cluster 804 also has the smallest and lowest bandwidth of the four clusters. In FIG. 8, relative vertical location of each signal represents a relative time each signal is observed.

FIG. 9 illustrates signal clustering for long duration broadband RF spectrum visualization, in accordance with another representative embodiment.

The signal clustering shown in FIG. 9 is based on an actual example. As shown in FIG. 9, signal occupancy is shown by presence of signal components at bandwidths in times from 0 seconds to 12.6353 seconds. Active clusters are shown on the right side, and may represent signal components with occupancy above a predetermined threshold. The signal occupancy in FIG. 9 may be color-coded, such as from black to blue to green to yellow to green, with green representing the largest cluster, and yellow representing the smallest cluster(s) above the predetermined threshold.

Figure 10:
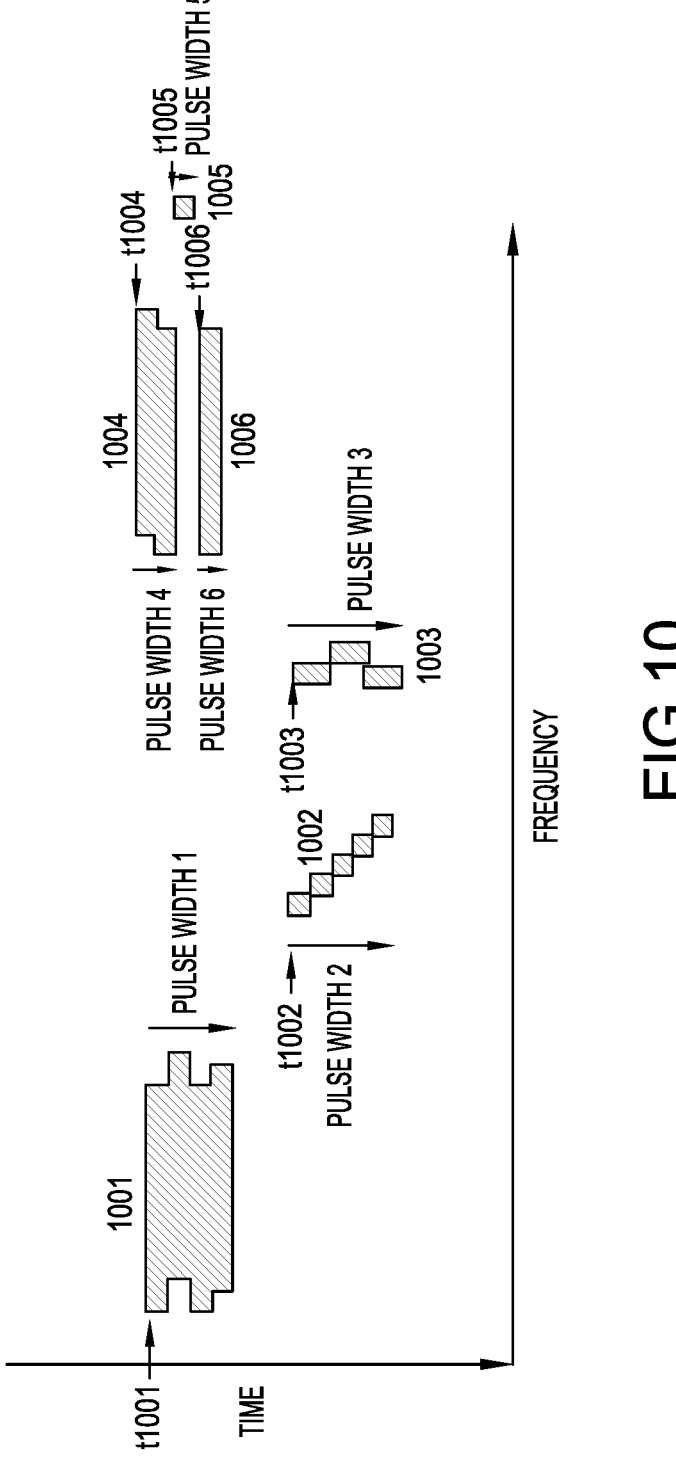
FIG. 10 illustrates RF feature extraction in the time domain for long duration broadband spectrum visualization, in accordance with a representative embodiment.

FIG. 10 illustrates RF feature extraction in the time domain for long duration broadband spectrum visualization, in accordance with a representative embodiment.

In FIG. 10, FFT results are plotted in time (Y axis) versus frequency (X axis). six FFT results are shown in FIG. 10 as FFT result 1001, FFT result 1002, FFT result 1003, FFT result 1004, FFT result 1005 and FFT result 1006. As shown in FIG. 10, the process resulting in FIG. 5 is continued for multiple FFT results along with time to obtain timing parameters such as time and pulse width of the signal. Occurrence time of the signal is extracted as a beginning of the signal. If extracted RF feature results are connected in multiple FFT results such as FFT result 1001, FFT result 1002, FFT result 1003, and FFT result 1004, those signals are combined and pulse width is extracted as a time difference between the beginning and end of the signal.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, long duration broadband RF spectrum visualization enables analysis and visualization of long duration broadband RF spectrum signals using a controller that selectively reduces the amount of data processed to generate the visualization. Long duration broadband RF spectrum visualization enables fast production of visualizations based on large amounts of long duration broadband RF IQ data. Resultantly, long duration broadband RF spectrum visualization enables measurement and analysis of long duration broadband RF spectrum signals.

Although long duration broadband RF spectrum visualization has been described with reference to several exemplary embodiments, it is understood that the words that have been used are words of description and illustration, rather than words of limitation. Changes may be made within the purview of the appended claims, as presently stated and as amended, without departing from the scope and spirit of long duration broadband RF spectrum visualization in its aspects. For example, rather than pre-clustering and final clustering, one or more other data compression technique may be used to achieve a necessary data reduction. Additionally or alternatively, instead of RF spectrum signal feature extraction, peak and average of an FFT signal may be computed for a specified time duration such as 20 ms for example, and pre-clustering may be performed for the peak and average FFT signals to create a pre-clustering database. Although long duration broadband RF spectrum visualization has been described with reference to particular means, materials and embodiments, long duration broadband RF spectrum visualization is not intended to be limited to the particulars disclosed; rather long duration broadband RF spectrum visualization extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A circuit for processing data for RF spectrum signals (radio frequency spectrum signals), comprising:
   an input interface;
   a controller comprising a controller memory that stores instructions; and a processor that executes the instructions, wherein when executed by the processor, the instructions cause the circuit to:
   obtain representative RF feature vectors of pre-sorted cluster information for the RF spectrum signals via the input interface;
   group the representative RF feature vectors of the pre-sorted cluster information for the RF spectrum signals into final clusters for the RF spectrum signals;
   compute representative RF feature vectors for the final clusters for the RF spectrum signals;
   determine signal occupancy of each final cluster within a corresponding set display time for each of the RF spectrum signals; and
   generate visualization data for each final cluster for the RF spectrum signals for a display in accordance with the signal occupancy within the corresponding set display time for the RF spectrum signals.

2. The circuit of claim 1, further comprising:
   an RF feature database that stores the pre-sorted cluster information.

3. The circuit of claim 1, wherein the visualization data is configured to generate a visualization for the RF spectrum signals comprising a visualization of a long duration RF spectrogram for the RF spectrum signals.

4. The circuit of claim 1, further comprising:
   a user interface, wherein
   an amount of data of the final clusters for the RF spectrum signals is less than an amount of data for the representative RF feature vectors of the pre-sorted cluster information for the RF spectrum signals; and
   grouping of the representative RF feature vectors is performed in accordance with input clustering conditions input via the user interface and including a number of target final clusters, weight vectors for parameters of the RF feature vectors, and a time-frequency range.

5. The circuit of claim 4, wherein
   each set display time is set in accordance with display time resolution input via the user interface, and the signal occupancy represents a relative amount of time during which signals in a cluster are present during a period between a first time and a second time.

6. The circuit of claim 1, wherein the RF feature vectors are extracted from the RF spectrum signals and include at least one of frequency, bandwidth, intensity, or pulse width.

7. The circuit of claim 1, further comprising:

an RF data pre-clustering sub-circuit configured to group RF features into the pre-sorted clusters based on similarity.

8. The circuit of claim 7, further comprising:

an RF spectrum signal feature extractor sub-circuit configured to detect transformed signals above a predefined threshold level and extract RF features grouped by the RF data pre-clustering sub-circuit.

9. The circuit of claim 8, further comprising:

a fast Fourier transform processing sub-circuit configured to transform digitized RF spectrum signals into the transformed signals detected by the RF spectrum signal feature extractor sub-circuit.

10. The circuit of claim 9, further comprising:

a database memory configured to store the pre-sorted clusters grouped by the RF data pre-clustering sub-circuit and time-population data for each pre-sorted cluster.

11. The circuit of claim 10, wherein a visualization of each final cluster for the RF spectrum signals is generated by the controller reading pre-sorted clusters from the database memory to visualize a long duration RF spectrogram.

12. A system for processing and displaying data for RF spectrum signals (radio frequency signals), comprising:

a vector signal analyzer comprising a display;

an input interface;

a controller comprising a controller memory that stores instructions; and a processor that executes the instructions, wherein when executed by the processor, the instructions cause the system to:

obtain representative RF feature vectors of pre-sorted cluster information for the RF spectrum signals via the input interface;

group the representative RF feature vectors of the pre-sorted cluster information for the RF spectrum signals into final clusters for the RF spectrum signals;

compute representative RF feature vectors for the final clusters for the RF spectrum signals;

determine signal occupancy of each final cluster within a corresponding set display time for each of the RF spectrum signals; and generate a visualization of each final cluster for the RF spectrum signals for the display of the vector signal analyzer in accordance with the signal occupancy within the corresponding set display time for the RF spectrum signals.

13. The system of claim 12, further comprising:

an RF feature database that stores the pre-sorted cluster information, wherein the visualization of each final cluster for the RF spectrum signals provides a visualization of a long duration RF spectrogram for the RF spectrum signals.

14. The system of claim 13, further comprising:

a user interface, wherein an amount of data of the final clusters for the RF spectrum signals is less than an amount of data for the representative RF feature vectors of the pre-sorted cluster information for the RF spectrum signals; and grouping of the representative RF feature vectors is performed in accordance with input clustering conditions input via the user interface and including a number of target final clusters, weight vectors for parameters of the RF feature vectors, and a time-frequency range.

15. The system of claim 14, wherein each set display time is set in accordance with display time resolution input via the user interface, and the signal occupancy represents a relative amount of time during which signals in a cluster are present during a period between a first time and a second time.

16. The system of claim 12, wherein the RF feature vectors are extracted from the RF spectrum signals and include at least one of frequency, bandwidth, intensity, or pulse width.

17. The system of claim 12, further comprising:

an RF data pre-clustering sub-circuit configured to group RF features into the pre-sorted clusters based on similarity; and an RF spectrum signal feature extractor sub-circuit configured to detect transformed signals above a predefined threshold level and extract RF features grouped by the RF data pre-clustering sub-circuit.

18. The system of claim 17, further comprising:

a fast Fourier transform processing sub-circuit configured to transform digitized RF spectrum signals into the transformed signals detected by the RF spectrum signal feature extractor sub-circuit.

19. The system of claim 18, further comprising:

a database memory configured to store the pre-sorted clusters grouped by the RF data pre-clustering sub-circuit and time-population data for each pre-sorted cluster.

20. The system of claim 19, wherein the visualization of each final cluster for the RF spectrum signals is generated by the controller reading pre-sorted clusters from the database memory to visualize a long duration RF spectrogram.

* * * * *